Feb. 21, 1933. J. S. PECKER 1,898,097
ROTARY WINGED AIRCRAFT
Filed March 12, 1932 2 Sheets-Sheet 2

INVENTOR.
Joseph S. Pecker
BY
ATTORNEYS.

Patented Feb. 21, 1933

1,898,097

UNITED STATES PATENT OFFICE

JOSEPH S. PECKER, OF PHILADELPHIA, PENNSYLVANIA, ASSIGNOR TO AUTOGIRO COMPANY OF AMERICA, OF PHILADELPHIA, PENNSYLVANIA, A CORPORATION OF DELAWARE

ROTARY WINGED AIRCRAFT

Application filed March 12, 1932. Serial No. 598,345.

This invention relates to rotary winged aircraft and is especially concerned with the type of craft which is provided with a normally air driven sustaining rotor system comprising pivotally and rotatively mounted sustaining wings or blades.

In considering the general nature and objects of this invention it should first be borne in mind that it is desirable in a craft of the type above referred to to make provision for initiating rotation of the rotor system prior to take-off from the ground and also to employ a means by which the rotary motion of the sustaining wings may be retarded and stopped after making a landing. With the foregoing in mind, the craft is preferably equipped with a rotor starter and a rotor brake both of which are provided with controlling means for actuation thereof from a cockpit of occupant's compartment in the body of the craft.

Generally considered, this invention has in view simplification of the control operation of a craft of this type, especially the rotor brake and rotor starter controls, and at the same time making the operation of such controls as fool-proof as possible.

Additionally, the invention has in view a mechanism whereby to prevent undesired or unintentional application or use of the rotor brake or rotor starter in normal flight operation. This is of advantage and importance, since in all normal flight it is desirable that the rotor system shall be permitted entirely free rotation under the influence of flight forces.

Still further, and with the foregoing in mind, this invention contemplates the provision of means, automatically operative upon take-off, for positively locking the control means for the rotor brake and rotor starter in a position or condition in which they will not affect rotation of the rotor in normal flight. According to this invention, furthermore, the foregoing objects and advantages are attained in or in combination with a control system for the rotor starter and rotor brake which includes a single operating element movable to one position to apply the brake and movable to another position to engage the starter. It will be seen, therefore, that this invention further has in view the combination of the automatic locking means above referred to with an interlocked control arrangement for the rotor brake and rotor starter.

The specific nature of the invention as well as objects and advantages in addition to those referred to above will become more apparent from consideration of the following description making reference to the accompanying drawings, in which Figure 1 is a side elevational view of a craft, of the type here under consideration, with the novel structural features of this invention applied thereto;

Figure 5 is a somewhat diagrammatic view showing a modified form of construction, certain parts of this arrangement being illustrated in vertical section.

Figure 1:
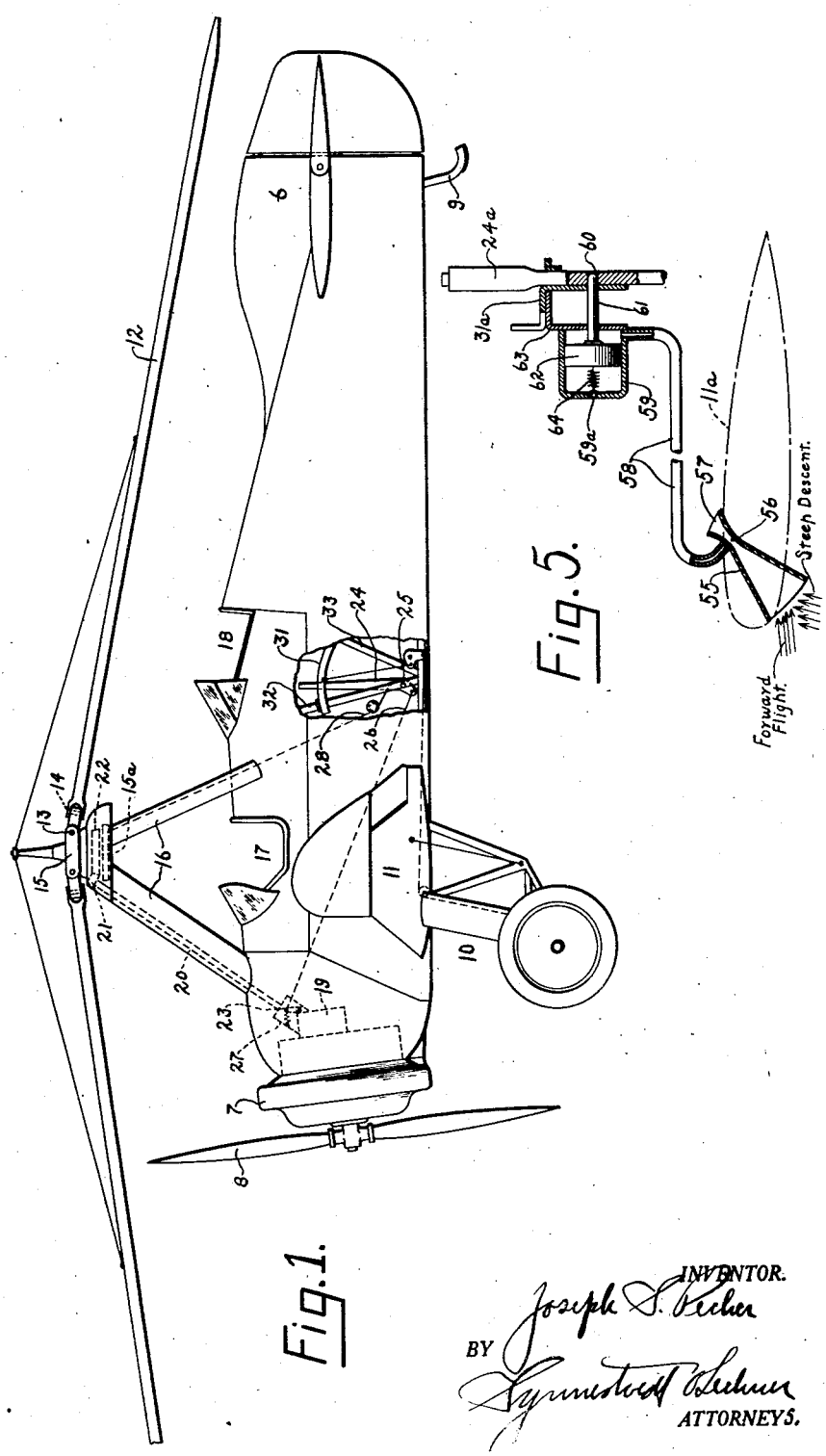

By reference first to Figure 1 it will be seen that the craft therein illustrated includes a body 5 having an empennage 6 at the rear thereof and forward propelling means at the front end thereof including an engine 7 and a propeller 8. The landing gear for the craft, as shown, includes a tail skid 9 and undercarriage mechanism generally indicated at 10.

While relatively small fixed lifting surfaces 11 may be provided at opposites of the body of the craft, the primary means of sustention for the craft takes the form of a pivotally and rotatively mounted system of sustaining blades or wings 12, joined as by horizontal and vertical pivots 13 and 14, respectively, to a common hub or axis structure 15. For the purpose of mounting the rotor system above the body of the craft, a plurality of post or leg elements 16 are preferably employed. As seen in Figure 1, the posts 16 constitute a pylon structure for supporting the rotor hub generally vertically above the forward cockpit 17. The craft shown is also provided with an additional cockpit 18, and in this instance the controls are located in this rear cockpit 18.

The rotor starter mechanism is preferably arranged to transmit power from the forward propulsion engine 7 to the hub of the rotor and for this purpose the craft of Figure 1 is shown as being equipped with a power take-off and clutch unit 19 located just rearwardly of the engine 7, and a power or torque transmitting shaft 20 extended generally upwardly and rearwardly to the rotor hub to be connected therewith through the intermediation of gears 21 and 22. Various details of a rotor starter mechanism of the character shown in Figure 1 and referred to just above need not be considered in detail herein, since they form the subject matter of the copending application of Joseph S. Pecker, Serial No. 512,383, filed January 30th, 1931. For the present purposes, however, it should be observed that the lower driving or power take-off unit includes, as above indicated, a clutch mechanism and, by reference to Figure 1, it will be seen that I have illustrated an actuating arm 23 for the clutch, this arm being connected with a lower portion of lever 24, pivoted as at 25, by means of the cable 26. A releasing spring 27 may also be associated with the clutch actuating arm 23.

Further, while the details of the brake mechanism need not be considered in detail herein (this subject matter being the basis of the copending application of Joseph S. Pecker, Serial No. 545,451, filed June 19th, 1931), at the same time, it should be observed that a brake is preferably provided, as indicated diagrammatically at 15a, from which an operating connection 28 is extended downwardly into the pilot's cockpit 18 for connection with the operating lever 24, as at 29. A guide pulley 30 may be provided for the cable 28.

Figure 2:
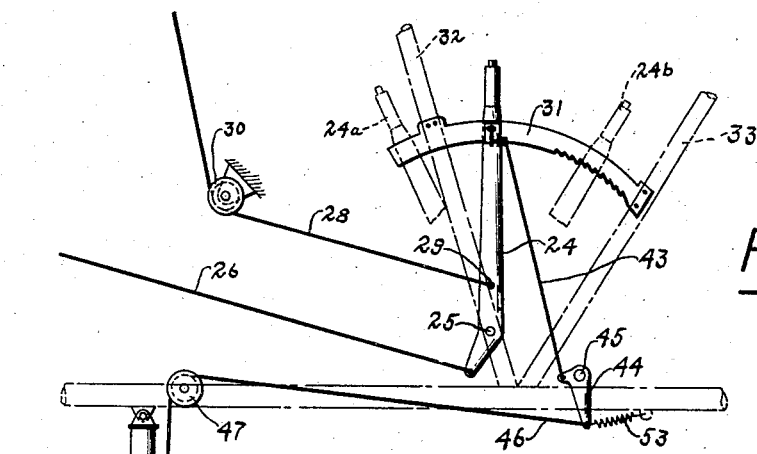
Figure 2 is a somewhat diagrammatic layout of certain parts of the control system illustrated in Figure 1, this view including a showing of the control system with a portion of the landing gear for the craft.

More particular reference should now be made to Figure 2 from which it will be seen that the operating lever 24 for the rotor brake and rotor starter is pivotally movable across the quadrant or guide 31, suitably supported on braces 32 and 33 of the fuselage framing. The arrangements are such that when the operating lever 24 is moved forwardly to the position indicated in dot and dash lines at 24a the starter clutch is engaged and that when the lever is moved rearwardly to the position indicated at 24b the brake is actuated to retard or stop rotation of the rotor. The mid position of the lever 24 (full line showing in Figure 2) is a neutral position in which neither the rotor starter nor the rotor brake is effective.

While the foregoing common control for the rotor starter and rotor brake forms no part of the present invention per se, this being described and claimed in the copending application of Harold F. Pitcairn, Serial No. 547,203, filed June 27th, 1931, it is to be observed that an understanding of its operation is necessary to a full comprehension of this invention, since various features of this invention involve a cooperative relation of certain other parts with the common control.

Figure 3:
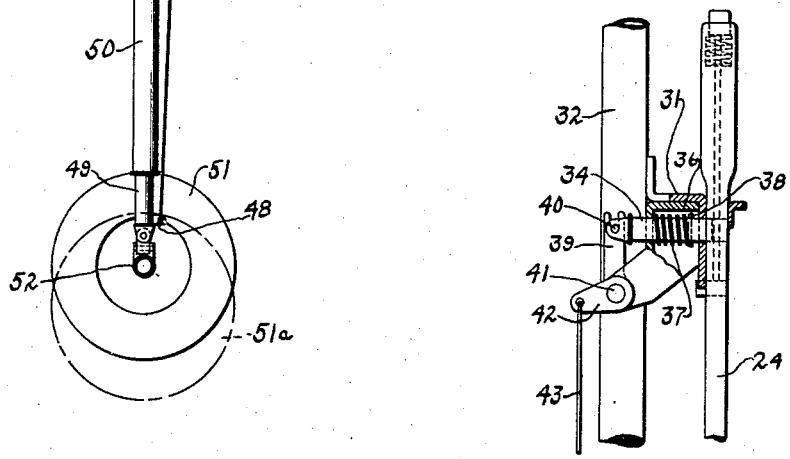
Figures 3 and 4 are views of certain details of the structure shown in Figures 1 and 2.

As best seen in Figure 3 the quadrant or guide 31 is provided, adjacent the neutral position above referred to, with a lock or catch device including a pin 34 movable transversely into and out of an aperture 35 (see Figure 4) in an upper portion of the lever 24. The pin 34 is mounted in a bracket 36 which may conveniently be secured to the quadrant 31, and a spring 37, reacting against cotter 38, normally urges the pin 34 to the right, as viewed in Figure 3, and thus into the aperture 35 of lever 24.

This pin may be disengaged by means of the forked arm 39 engaging a small pin 40. Movement of the arm 39 is effected by virtue of its mounting on the shaft 41 to which an additional lever or arm 42 is also secured. An actuating connection or cable 43 is extended from the arm 42 downwardly to one arm of bell crank 44, pivoted as at 45, the other arm of the part 44 being coupled by means of a cable 46 extended forwardly over guide pulley 47 and thence downwardly to an ear or lug 48 carried by a vertically movable part 49 of shock absorber 50. This shock absorber, of course, constitutes a part of the landing mechanism of the craft, and at its lower end a wheel or tire 51 is mounted on the axle 52. At this point it might be observed that the full line showing of the shock absorber parts and the wheel 51 in Figure 2 represents the positions which these parts occupy when the craft is on the ground. On the other hand, the dot and dash showing of the wheel at 51a indicates flight position.

A tension spring 53 is connected with one arm of the bell crank 44 in order normally to urge this device in one direction for reasons which will appear more fully hereinafter.

To consider the operation of the foregoing structure, assume first that the craft is on the ground and that it is desired to initiate rotation of the rotor system in preparation for making a take-off. Under these conditions, the shock absorber part 49 will occupy an upper position so that the spring 53 is permitted to take up slack in cable 46 and also to rock the bell crank 44 in a direction to exert a pull on the connection 43. By reference to Figure 3 it will be seen that a downward pull on the connection 43 will cause the lever or arm 39 to move outwardly away from the control lever 24 and this, in turn, retracts the pin 34 from the opening 35 in the control lever. In this condition, therefore, the control lever may be actuated forwardly to the position indicated at 24a in Figure 2 in order to connect the rotor starter and thus initiate rotation of the sustaining blades.

When the desired rotor R. P. M. has been acquired, the takeoff may be made and the lever 24 may be moved rearwardly again to the neutral position (full line showing in Figure 2). As soon as the wheels 51 leave the ground the shock absorbers become somewhat extended thus causing a drop in the position of the part 49. This, in turn, pulls cable 46 and rocks bell crank 44 against the force of spring 53 with the result that cable 43 extending upwardly to the control is slackened. Coil spring 37 now acts to move the pin 34 to the right, as seen in Figure 3, to lock the lever 24 in neutral position.

Figure 4:
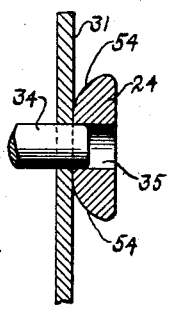

At this point, it should be observed that in the preferable arrangement and as seen in Figure 4, the lever 24 is provided with rounded or angled surfaces 54 so that in case the control lever is not accurately positioned in "neutral", it may readily be moved to such position in order to permit the pin 34 to enter the recess 35. In any event, when the pin 34 has once entered the recess 35, during normal flight, it may not be retracted until the craft has again come to the ground.

Upon landing, it may be desirable to apply the rotor brake and this may be accomplished by movement of the lever 24 rearwardly to the position indicated at 24b in Figure 2, since the connection to the landing gear has again been released by contact of the wheels with the ground, this, in turn, providing for withdrawal of the pin 24 by the spring 53.

In considering the modified arrangement of Figure 5, attention is first called to the fact that in accordance with the structure here shown, the operation of the safety catch or device is controlled by the relative airflow incident to flight of the craft. To accomplish this a belled Pitot tube device 55 is mounted on the craft, preferably outside of the slipstream of the propeller, for example, on a portion of one of the fixed lifting surfaces designated by the numeral 11a in Figure 5. The device 55, furthermore, is belled in such manner as to permit the flow of air thereinto either when the craft is in high speed forward flight or when the craft is descending at a steep angle or vertically. Beyond the restriction or venturi 56, the device is again belled outwardly as shown at 57 and the tube or conduit 58 is extended from the restriction for communication with a cylinder 59.

The control lever for the brake and/or rotor starter is indicated at 24a in Figure 5 and is shown as being provided with an aperture 60 adapted to receive pin 61 extended laterally for connection with the piston 62 working in cylinder 59. The quadrant 31a may be employed to support the cylinder 59 as by means of bracket 63, the said quadrant 31a also being apertured to pass the pin 61. A return spring 64 is associated with the piston 62 and the cylinder is also provided with an aperture 59a at the left end thereof for communication with the atmosphere. In operation of the device, after taking off from the ground, the reduced pressure in the connection 58 and cylinder 59 permits the atmospheric pressure entering through port 59a to move the piston to the right against the force of spring 64. The pin 61 thus enters the aperture 60 in the control lever. It will be apparent, of course, that as soon as the craft has returned to the ground, the absence of airflow over the wing 11a will result in equalization of the pressures in opposite ends of the cylinder 59, so that the spring 64 may move the piston to the left and retract the locking pin.

With the foregoing description of the structure and operation of this invention in mind, it will be seen that what I contemplate, in its broad aspect, constitutes a means for automatically preventing actuation, in normal flight, of any mechanism with which a craft of this type may be equipped and which is at least primarily intended only for operation when the craft is not in normal flight. Further, it will be seen that according to this invention, the foregoing is accomplished, in accordance with one form, by the use of a control means coupled to some element of the craft which is adapted to contact with the ground upon landing and which is further movable, upon take-off, to actuate the locking device. In accordance with the arrangement of Figure 5, the safety device is operated by the flow of air incident to flight of the craft, the arrangements being such that actuation of the rotor starter and/or brake lever will be prevented either in high speed forward flight or in vertical descent and will not be released until the craft has come to rest.

While numerous advantages of the invention should now be apparent, it might be noted in conclusion that, by the present invention, a very desirable safety feature is provided, since neither the rotor starter nor the rotor brake, at least under normal conditions, can be applied during flight of the craft. It is also observed that the foregoing is accomplished by structure which is effective, sturdy and yet very simple from the standpoint of installation, inspection and repair. Additional advantageous features are involved in the cooperation of the novel safety mechanism herein disclosed with an interlocked or common control for the rotor starter and rotor brake, and further in the fact that the controls with which a craft of this type is normally equipped are not in any way complicated by application of the structure of this invention.

I claim:—

1. An aircraft having as its primary means of sustention a system of rotatively mounted sustaining blades or wings arranged for normally free actuation by relative air flow in flight, starter means for initiating rotation of the rotor system prior to take-off from the ground, alighting mechanism for the craft, and control means for the starter means operatively associated with a part of the alighting mechanism, the control means including a device whereby, upon take-off, the starter means may be positively maintained in inoperative condition until the craft returns to the ground.

2. An aircraft including, as its primary means of sustention, a rotor of normally freely air actuated sustaining wings or blades, a starter mechanism for initiating rotation of the rotor including control means therefor adapted to render the starter operative or inoperative, alighting mechanism for the craft including a part movable to one position when the craft is on the ground and to another position when the craft is in flight, and a locking device operatively associated with said part and with said control means and adapted to maintain the starter mechanism in inoperative conditon, by virtue of its association with said control means, when said part is in flight position.

3. An aircraft including, as its primary means of sustention, a rotor of normally freely air actuated sustaining wings or blades a starter mechanism for initiating rotation of the rotor including control means therefor adapted to render the starter operative or inoperative, an element associated with the craft and constructed and arranged to assume one position with the craft on the ground and another position with the craft in flight, and a locking device operatively associated with said element and with said control means and adapted to maintain the starter mechanism in inoperative condition, by virtue of its association with said control means, when said element is in flight position.

4. An aircraft including a normally air driven sustaining rotor, a starter mechanism for initiating rotation of the rotor including a movable control element whereby to render the starter effective or ineffective, and means tending to maintain the control element in ineffective position upon take-off of the craft from the ground.

5. An aircraft including a normally air driven sustaining rotor, a starter mechanism for initiating rotation of the rotor including a movable control element whereby to render the starter effective or ineffective, means tending to maintain the control element in ineffective position upon take-off of the craft from the ground, and means operative upon landing of the craft on the ground to unlock said control element, whereby to permit actuation thereof to effective position.

6. An aircraft including a normally wind driven sustaining rotor, a starter mechanism for initiating rotation of said rotor, alighting mechanism for the craft, and means for controlling the operation of the starter mechanism, the control means being operatively associated with a movable part of the alighting mechanism.

7. An aircraft including a normally wind driven sustaining rotor, a starter mechanism for the rotor with means for rendering the starter mechanism effective or ineffective including a movable control member, a locking device associated with said control member and adapted to maintain it in position to render the starter mechanism ineffective, and means operable upon take-off of the craft from the ground for actuating said locking device to maintain the starter in ineffective condition as aforesaid.

8. An aircraft including a normally wind driven sustaining rotor, a starter mechanism for the rotor with means for rendering the starter mechanism effective or ineffective including a movable control member, a locking device associated with said control member and adapted to maintain it in position to render the starter mechanism ineffective, and means operable upon take-off of the craft from the ground for actuating said locking device to maintain the starter in ineffective condition as aforesaid, together with means operable upon landing of the craft on the ground to release said locking device and thus permit free movement of the control member to starter-effective position.

9. An aircraft including a normally wind driven sustaining rotor, a starter mechanism for initiating rotation of the rotor and adapted to be operatively coupled and uncoupled with respect to the rotor, a pivoted control lever for controlling the operation of the starter mechanism, whereby to provide for operation of the starter with the lever in one position and for disconnection thereof with the lever in another position, a disengageable locking device adapted to maintain the lever in starter-ineffective position, and control means for said device adapted to maintain the device in disengaged condition when the craft is on the ground and to engage the lock upon take-off.

10. An aircraft including a sustaining rotor arranged for normally free rotation under the influence of flight forces, a mechanism for affecting rotation of said rotor at least primarily adapted for use when the craft is not in flight, manual control means for rendering said mechanism effective or ineffective, and means tending to maintain the control means in a condition to render said mechanism ineffective when the craft is in normal flight, the last mentioned means including a movable element adapted to contact with the ground and to assume one position when the craft is on the ground and another position when the craft is in flight.

11. An aircraft having as its primary means of sustention a system of rotatively mounted sustaining blades or wings arranged for normally free actuation by relative air flow in flight, braking means for retarding rotation of the rotor system, alighting mechanism for the craft, and control means for the braking means including a manually operable member and means operatively associated with a part of the alighting mechanism, the last mentioned means including a device whereby, upon take-off, the manual control may be positively maintained in inoperative position until the craft returns to the ground.

12. An aircraft including, as its primary means of sustention, a rotor of normally freely air actuated sustaining wings or blades, a braking mechanism for retarding rotation of the rotor including manual control means therefor adapted to render the braking mechanism operative or inoperative, an element associated with the craft and constructed and arranged to assume one position with the craft on the ground and another position with the craft in flight, and a locking device operatively associated with said element and with said control means and adapted to maintain the braking mechanism in inoperative condition, by virtue of its association with said control means, when said element is in flight position.

13. An aircraft including a normally wind driven sustaining rotor, a starter for the rotor adapted to be coupled and uncoupled with respect thereto, a brake for retarding rotation of the rotor, control means for the starter and for the brake, alighting mechanism for the craft, and means operatively associated with said control means and adapted to maintain the starter and the brake both in ineffective conditions upon take-off of the craft from the ground.

14. An aircraft including a normally wind driven sustaining rotor, a starter for the rotor adapted to be coupled and uncoupled with respect thereto, a brake for retarding rotation of the rotor, control means for the starter and for the brake including an interlock between the two for preventing simultaneous actuation thereof, said control means also being arranged to render both the brake and the starter ineffective, a movable element mounted on the craft adapted to contact with the ground, and means associated with said element and with said control means, the last means including a device adapted to maintain the control means in a condition in which both the starter and the brake will be ineffective, and operating means for said device so coupled with said element as to maintain, when the craft is in normal flight, the control means in the condition aforesaid, whereby to prevent accidental operation of either the brake or the starter with the craft in normal flight.

15. An aircraft including a sustaining rotor arranged for normally free rotation under the influence of flight forces, a mechanism for affecting rotation of said rotor at least primarily adapted for use when the craft is not in flight, manual control means for rendering said mechanism effective or ineffective, alighting mechanism for the craft including shock absorbing means having a part movable to different positions with the craft at rest on the ground and with the craft in flight, and means tending to maintain the control means in a condition to render said mechanism ineffective when the craft is in normal flight including an actuating connection connected with the movable part of the shock absorber means.

16. In an aircraft, the combination of a rotative-wing sustaining unit, a manually controllable brake for said unit, and means for preventing application of the brake when the aircraft is in flight.

17. In an aircraft, the combination of a rotative-wing sustaining unit, a rotative mounting for said unit providing for normally free actuation of the unit by relative air flow in flight, a manually controllable brake for said unit, and means for preventing application of the brake when the aircraft is in flight.

18. In an aircraft, the combination of a rotative-wing sustaining unit, a rotative mounting for said unit providing for normally free actuation of the unit by relative air flow in flight, a manually controllable mechanism for affecting rotation of said unit, and means for rendering said mechanism ineffective when the aircraft is in flight.

19. An aircraft including a sustaining rotor arranged for normally free rotation under the influence of flight forces, a mechanism for affecting rotation of said rotor at least primarily adapted for use when the craft is not in flight, manual control means for rendering said mechanism effective or ineffective, and means tending to maintain the control means in a condition to render said mechanism ineffective when the craft is in normal flight including a device operable by the action of relative air flow incident to flight of the craft.

In testimony whereof I have hereunto signed my name.

JOSEPH S. PECKER.